Figure 1:
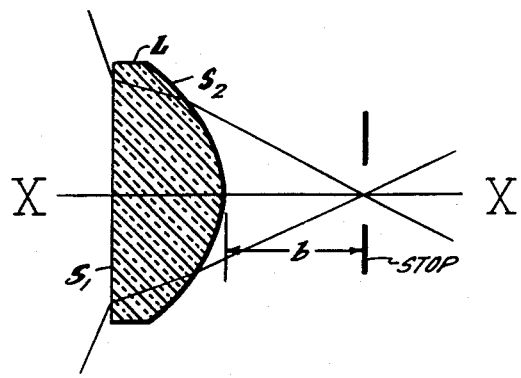

Nov. 21, 1950     W. W. MERTÉ     2,530,397
ANASTIGMATIC LENS
Filed Feb. 18, 1948

INVENTOR.
WILLY W. MERTÉ

Patented Nov. 21, 1950

2,530,397

UNITED STATES PATENT OFFICE 2,530,397

ANASTIGMATIC LENS

Willy Walter Merté, Heidenheim/Brenz, Germany; Henry L. Beigel ancillary administrator of said Willy Walter Merté, deceased Application February 18, 1948, Serial No. 9,241

3 Claims. (Cl. 88—57)

(Granted under the act of March 3, 1883, as amended April 30, 1928; 370 O. G. 757)

The invention described herein may be manufactured and used by or for the Government for governmental purposes without payment to me of any royalty thereon.

This invention relates to optical lenses and lens systems and more particularly to lenses corrected for astigmatism over the entire lens field by matching a rear conic curve surface of revolution with a flat front objective surface.

Heretofore corrections for astigmatism in lenses have been pursued by bending the lenses and providing doublet or triplets using plane and spherical surfaces but complete correction, particularly for single lenses, has been impossible since spherical surfaces can not properly bring all rays to focus on a flat field. While such corrections may be made for various zone heights, the zonal aberrations are still present which can only be reduced by stopping the lens down.

In accordance with the present invention, a single lens may be stigmatically corrected by providing a plano front objective surface and a second order conic curve surface of revolution to bring paraxial rays and oblique light pencils to the center of a stop positioned on the side of the vertex of the conic surface. A lens of this type, which is of sufficient thickness to be separated, can be corrected for longitudinal chromatic aberration and lateral color by using glass elements of the same index of refraction and different dispersion values cemented in the separation.

Lenses made in accordance with this invention will give a wide angle field of view approaching 90 degrees half angle. Such lenses would have wide application, as for example in spectacles although the eye can only use 60° full angle in which lenses of only small diameters may be used, for photographic equipment, for instrument objective pieces, etc.

It is a primary object of this invention to provide an anastigmatic lens.

It is a further object of this invention to provide a lens component having a front objective plane surface and a rear conic curve surface of revolution with a stop positioned on the side of the vertex of the conic curve surface to bring all rays of light striking the plane surface to a common point at the center of the stop.

It is another object of this invention to provide a lens system having a plano objective front surface and a rear second order conic curve surface of revolution with the lens elements all being of the same index of refraction and cemented, said intermediate elements having spherical surfaces and having dispersion values different from the objective and rear elements to correct longitudinal chromatic aberration and lateral color without altering the axial image point of the system.

Figure 2:
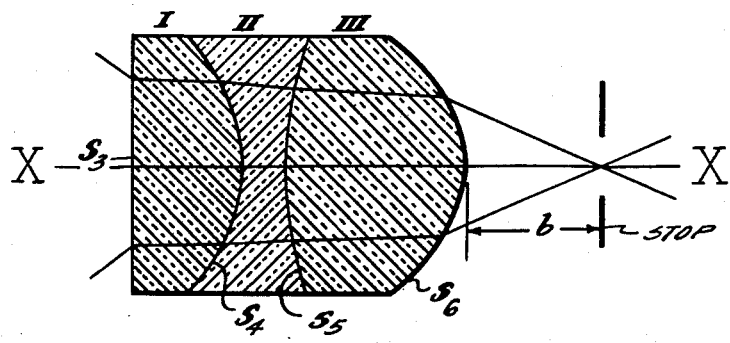

Other objects and advantages will become more apparent as the description proceeds when taken in conjunction with the accompanying drawings, in which:

Fig. 1 is a sectional view of a single lens made in accordance with this invention; and Fig. 2 is a sectional view of a lens system made in accordance with this invention.

Referring now to Fig. 1 there is shown a lens element L having a flat front surface $s_1$ and an aspheric rear surface $s_2$ given by the equation $$y^2 = a_2 x^2 + a_1 x$$

where:

$$a_1 = -2 f_0 (n-1)$$

and $$a_2 = \frac{a_1^2 - 4 a_1 b}{4 b^2}$$

in which $x$ is the ordinate along the X axis of revolution, $y$ is the ordinate normal to the X axis of revolution, $n$ is the index of refraction of the lens material, $b$ is the distance of the stop from the rear lens vertex and $f_0$ is the paraxial focal length. The above equations may then be written:

$$y^2 = \frac{a_1^2 - 4 a_1 b}{4 b^2} x^2 + a_1 x$$

and the values given to $f_0$, and $b$ as desired to obtain an aspherical surface for the purpose intended. That is, if used as a spectacle lens, such lens will give a completely anastigmatic image field when the distance between the center of rotation of the eye and the vertex of the back surface of the lens always equals $b$ which is usually considered to be about 25 mm. for eye glasses. When $4 a_1 b$ becomes greater than $a_1^2$ the conic curve will be an ellipse of revolution; when $4 a_1 b$ becomes equal to $a_1^2$ the curve will be a parabola of revolution; and when $4 a_1 b$ becomes less than $a_1^2$ the curve will be a hyperbola of revolution.

Where it is desirable to correct longitudinal chromatic aberration and lateral color, a lens element, or elements, may be used to form a cemented doublet, triplet, etc., where the elements are all of the same index of refraction. For the purpose of illustration, such a lens system has been shown in Fig. 2 wherein lens elements I, II, and III are all of the same index of refraction but have different dispersion or Abbe V numbers. For example, elements I and III may be crown glass while element II may be of flint glass. In accordance with this invention, the surface $s_3$ must be plano and the surface $s_6$ a conic curve surface of revolution computed by the formulas above for the purpose intended. The surfaces $s_4$ and $s_5$ are spherical and the radius of curvature for these surfaces computed in the usual manner to make color corrections in the system.

Such a lens or lens system made in accordance with applicant's invention has a wide angle field of view approaching 180 degrees full angle. While the invention has been illustrated and described for positive lenses it is to be understood that negative lenses and lens system, may be produced in accordance with this invention.

While I have illustrated and described preferred embodiments of my invention it is to be understood that various changes may be made without departing from the spirit and scope of my invention and I desire to be limited only by the scope of the appended claims.

I claim:

1. A wide angle lens component having a plano surface on the side of the longer conjugate and a conic curve surface of revolution on the side of the shorter conjugate with the vertex thereof being directed rearwardly and having a stop positioned behind said conic curve surface of revolution, said conic curve surface of revolution being a curve produced by the second order equation $$y^2 = \frac{a_1^2 - 4a_1b}{4b^2}x^2 + 4a_1x \text{ where } a_1 = -2f_0(n-1)$$

$b$ is the distance of the stop from the rear lens vertex, $f_0$ is the paraxial focal length, $n$ is the index of refraction, $x$ is the coordinate along the X axis of revolution, and $y$ is the ordinate normal to the X axis of revolution, whereby paraxial and oblique rays entering through the plano surface are all refracted from the conic surface of revolution into an anastigmatic image.

2. A wide angle anastigmatic lens component of one or more lens elements of a single refractive index and with light transfer unbroken by air space having a plano front surface on the side of the longer conjugate, and an aspheric rear surface on the side of the shorter conjugate and a stop positioned behind said aspheric rear surface in a relation $$y^2 = \frac{a_1^2 - 4a_1b}{4b^2}x^2 + 4a_1x$$

where $a_1$ is equal to $-2f_0(n-1)$, $f_0$ is the paraxial focal length, $n$ is the index of refraction, $x$ is the coordinate along the X axis of revolution, $y$ is the ordinate normal to the X axis of revolution, and $b$ is the distance of the stop from the rear lens component vertex.

3. A wide angle anastigmatic compound lens component of a plurality of lenses having the same index of refraction and unequal dispersion values and being united at spherical surfaces, the invention which comprises having the front surface thereof on the side of the longer conjugate plano in combination with a second order surface of revolution on the side of the shorter conjugate and a stop positioned behind said second order surface of revolution along said shorter conjugate in the relation $$y^2 = \frac{a_1^2 - 4a_1b}{4b^2}x^2 + 4a_1x$$

where $a_1$ equals $-2f_0(n-1)$, $f_0$ is the paraxial focal length, $n$ is the common index of refraction of all the lens elements, $b$ is the distance of the stop from the rear lens vertex, $x$ is the coordinate along the X axis of revolution, and $y$ is the ordinate normal to the X axis of revolution whereby an anastigmatic image is formed behind the stop with longitudinal chromatic aberration and lateral color correction.

WILLY WALTER MERTÉ.

REFERENCES CITED

The following references are of record in the file of this patent:

UNITED STATES PATENTS

| Number | Name | Date |
| --- | --- | --- |
| 697,959 | Abbe | Apr. 22, 1902 |
| 934,579 | Straubel et al. | Sept. 21, 1909 |
| 949,501 | Von Rohr | Feb. 15, 1910 |
| 968,693 | Von Rohr | Aug. 30, 1910 |
| 1,507,212 | Silberstein | Sept. 2, 1924 |
| 1,968,222 | Richter | July 31, 1934 |
| 2,284,567 | French | May 26, 1942 |

FOREIGN PATENTS

| Number | Country | Date |
| --- | --- | --- |
| 616,565 | Germany | July 31, 1935 |
| 530,506 | Great Britain | Dec. 15, 1940 |